(12) United States Patent
Poorebrahim Gilkalaye et al.

(10) Patent No.: US 11,531,782 B1
(45) Date of Patent: Dec. 20, 2022

(54) SYSTEMS AND METHODS FOR FINDING A VALUE IN A COMBINED LIST OF PRIVATE VALUES

(71) Applicant: TripleBlind, Inc., Kansas City, MO (US)

(72) Inventors: Babak Poorebrahim Gilkalaye, Kansas City, MO (US); Riddhiman Das, Parkville, MO (US); Gharib Gharibi, Overland Park, MO (US)

(73) Assignee: TripleBlind, Inc., Kansas City, MO (US)

( * ) Notice: Subject to any disclaimer, the term of this patent is extended or adjusted under 35 U.S.C. 154(b) by 0 days.

(21) Appl. No.: 17/743,887

(22) Filed: May 13, 2022

(51) Int. Cl.
*H04L 29/06* (2006.01)
*G06F 21/62* (2013.01)

(52) U.S. Cl.
CPC ................................. *G06F 21/6245* (2013.01)

(58) Field of Classification Search
CPC .................................................. G06F 21/6245
See application file for complete search history.

(56) References Cited

U.S. PATENT DOCUMENTS

| | | | |
|---|---|---|---|
| 2015/0288662 A1* | 10/2015 | Bilogrevic | H04L 65/403 |
| | | | 713/168 |
| 2020/0304293 A1* | 9/2020 | Gama | G06F 17/16 |
| 2020/0394316 A1* | 12/2020 | Boehler | G06F 21/6245 |
| 2022/0247548 A1* | 8/2022 | Boehler | H04L 9/002 |

* cited by examiner

*Primary Examiner* — Jason K Gee

(57) ABSTRACT

A system and method are disclosed for each party of a group of m parties to be able to learn an Nth smallest value in a combined list of the values in which each party has separate lists of values. A method includes creating, by each party of a group of m parties, m lists of additive shares associated with each party's respective list of data, distributing, from each party to each other party in the group of m parties, m−1 of the lists of additive shares to yield a respective combined list of additive shares $W_i$ obtained by each party of the m parties, receiving from a trusted party a list of additive shares $V_i$ associated with a hot-code vector V, computing, in a shared space by each party, a respective $R_i$ value using a secure multiplication protocol and comparing, in the shared space, by each party and using secure multi-party comparison protocol, the respective $R_i$ to all elements in the respective combined list of additive shares $W_i$ to yield a total number $P_i$ of values in $W_i$ that are smaller than $R_i$. The value $P_i$ is used to either end the method or loop back for further processing with new values of $W_i$ and in some cases a new value of N.

19 Claims, 5 Drawing Sheets

SYSTEMS AND METHODS FOR FINDING A VALUE IN A COMBINED LIST OF PRIVATE VALUES

TECHNICAL FIELD

The present disclosure generally relates to secure multi-party computations and more specifically to an improved approach to finding an Nth value or the Nth smallest value in a combined list of data from various parties that desire to keep their respective data private.

BACKGROUND

In some scenarios, individuals with private data sets might want to combine or share their data for various purposes such as to have an artificial intelligence analysis performed or to help in a survey. When all the various private data is combined, there may be circumstances where sharing a particular value in the combined list of values might be valuable or useful. However, there is no mechanism of enabling the sharing of a particular nth value of a combined list without sharing other private data with the other members who have contributed data to the combined list.

In one example, countries might gather medical data and the various countries might want to find the median of the various values of the medical data but without revealing the specific medical data from the different countries. The data due to legal issues might not be able to be combined and analyzed to find the median.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

INTRODUCTION

Figure 1:
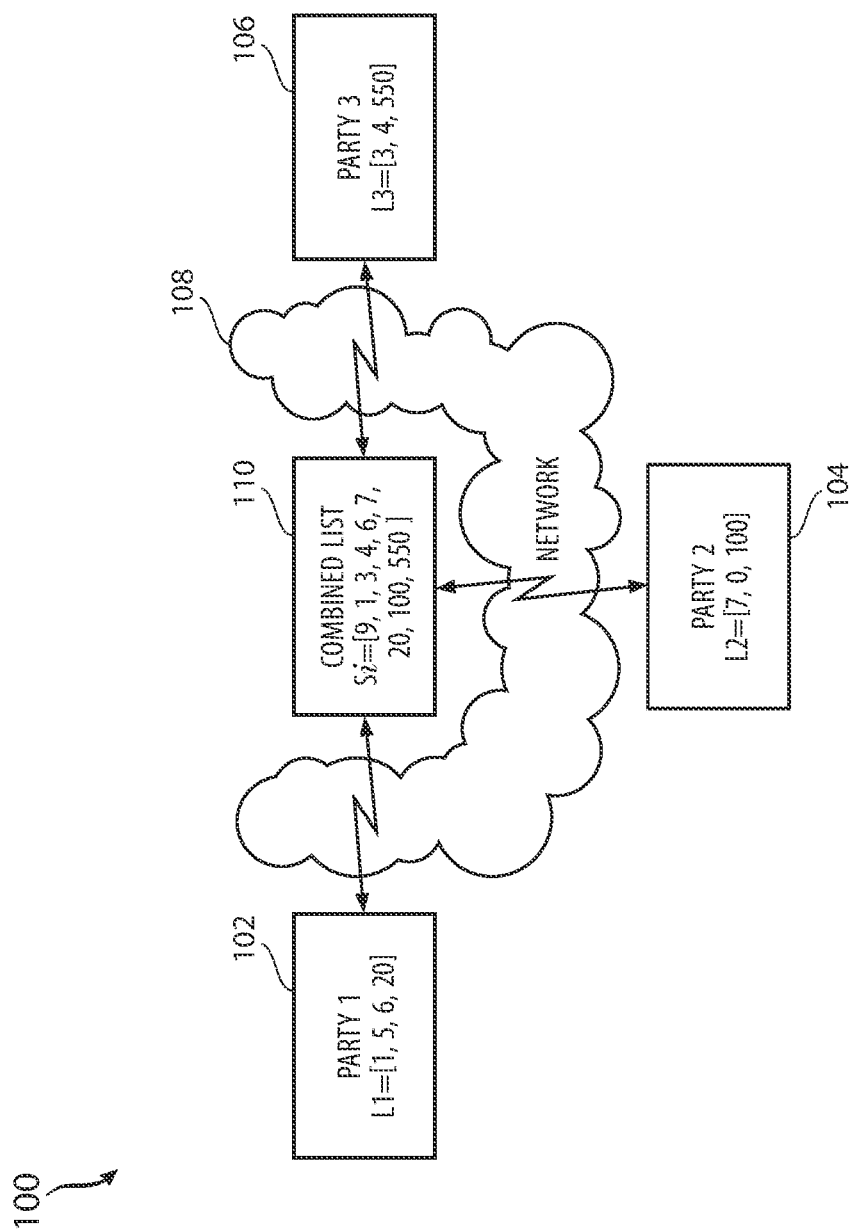
FIG. 1 illustrates a group of parties each with private data.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the following description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

BRIEF DESCRIPTION

In order to address the issue of how to share an Nth value of a combined list with the various members who shared private data to the combined list, the following system and method are disclosed. As noted above, the issue of combining the data might not be possible where a median or other value might be desired to be identified from the lists if they were combined.

The method enables separate parties to compute securely an $N^{th}$ smallest value in a combined list of values from m number of parties W. The method can include (1) creating, by each party of the m parties, m additive shares for each value in a respective list of values for each party of the m parties to yield m lists of additive shares for each party of the m parties; (2) distributing, from each party of the m parties, m−1 lists of additive shares from the m lists of additive shares for each party by distributing one of the m−1 lists of additive shares to each other party of the m parties to yield a respective combined list of shares $W_i$, having S values for each of the m parties, wherein S equals the total number of values in the combined list of values from the m parties; (3) receiving, from a trusted party and by each of the m parties, a respective list of additive shares $V_i$ associated with a hot-code vector V comprising a value of 1 randomly assigned a position in V and the rest of the values being 0; (4) computing, by each party of the m parties and via a SecureMult protocol, $R_i$=Sum(SecureMult($W_i$, $V_i$,); (5) applying a comparison protocol to compare, by each party of the m parties, R against all elements in W, such that each party learns a total number of values in W that are smaller than R as a value $P_i$, wherein $P_i$, values or shares add up to P and wherein a position or $R_i$ in $W_i$ is equal to $P_i$+1; (6) when N =P+1, returning, from each party, a value $R_i$ and concluding the method; (7) when N>P+1, removing, by each party, all numbers smaller than $R_i$, and $R_i$ as well, from each party's $W_i$ and setting N=N−(P+1) to yield a new $W_i$ and new N; (8) when N<P+1, removing, by each party, all numbers bigger than $R_i$, and $R_i$ as well, from $W_i$ to yield a new $W_i$; and (9) returning to an earlier step such as step (3).

A system can include a processor and a computer-readable storage device storing instructions which, when executed by the processor, cause the processor to perform operations or steps including one or more of the steps outlined above.

DETAILED DESCRIPTION

As introduced above, the disclosure in this case introduces a specific approach of enabling parties having private data that is combined into a larger combined list of data to be able to securely compute an Nth smallest value of the combined list without sharing the rest of their data with the other parties. In another aspect, the goal is to find the Nth smallest value in the combined list. Note that in one aspect, the combined list may or may not ever actually be combined in any one memory location. The combined list is a concept that is actually ever performed in practice. However, the process disclosed herein enables the sharing of some data as described that enables the parties each having their portion of the "combined list" to determine the Nth smallest value of the "combined list" or the data of all the parties.

The process generally involves the idea of how each party having some portion of the combined data can learn that there is a value X in their list that is smaller or bigger than a number they do not know. Uses of this approach can be where different entities such as countries may have medical data and what to know a value such as a median value related to a medical condition like a certain type of cancer across the different group of countries (parties). There may be laws the prevent the parties from sharing the raw data with each other. The approach disclosed herein involves using a processing of data in a "shared space" or "shared world" where the parties do not give the raw data from their respective lists to each other but they get from each other party a list of "additive shares" in which each value in the list of values is a "share" of the original raw data. The parties also get a list of "shares" Vi of a hot-code vector V from a trusted party. For example, V=[0, 0, 0, 1, 0, 0]. In this case, the fourth position in V is the one to be compared with all the other values. But the parties don't receive V they receive a "share" of V as shall be explained below. The parties each in the shared space perform a multi-party comparison protocol to compare one of the values or positions in the list to the other values in the list. The parties do not know which is the chosen position and they do not know the other values in the list (the raw values) because they are operating on shares instead of the raw data. In this manner, the parties only learn the outcome of the comparison protocol which is that a value X is smaller or bigger than a number that they party does not know.

Figure 2:
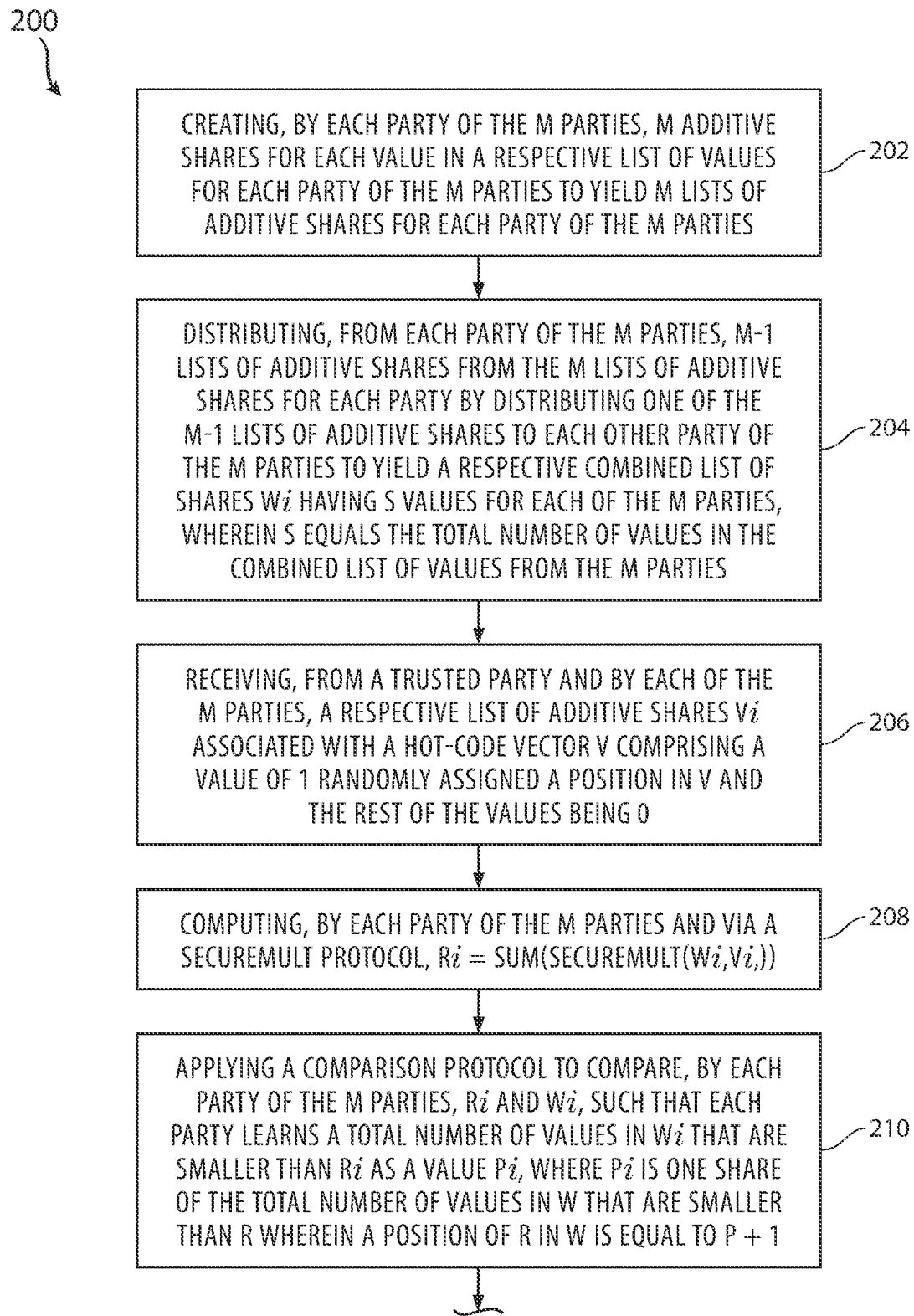
FIG. 2 illustrates a method embodiment.
Figure 2:
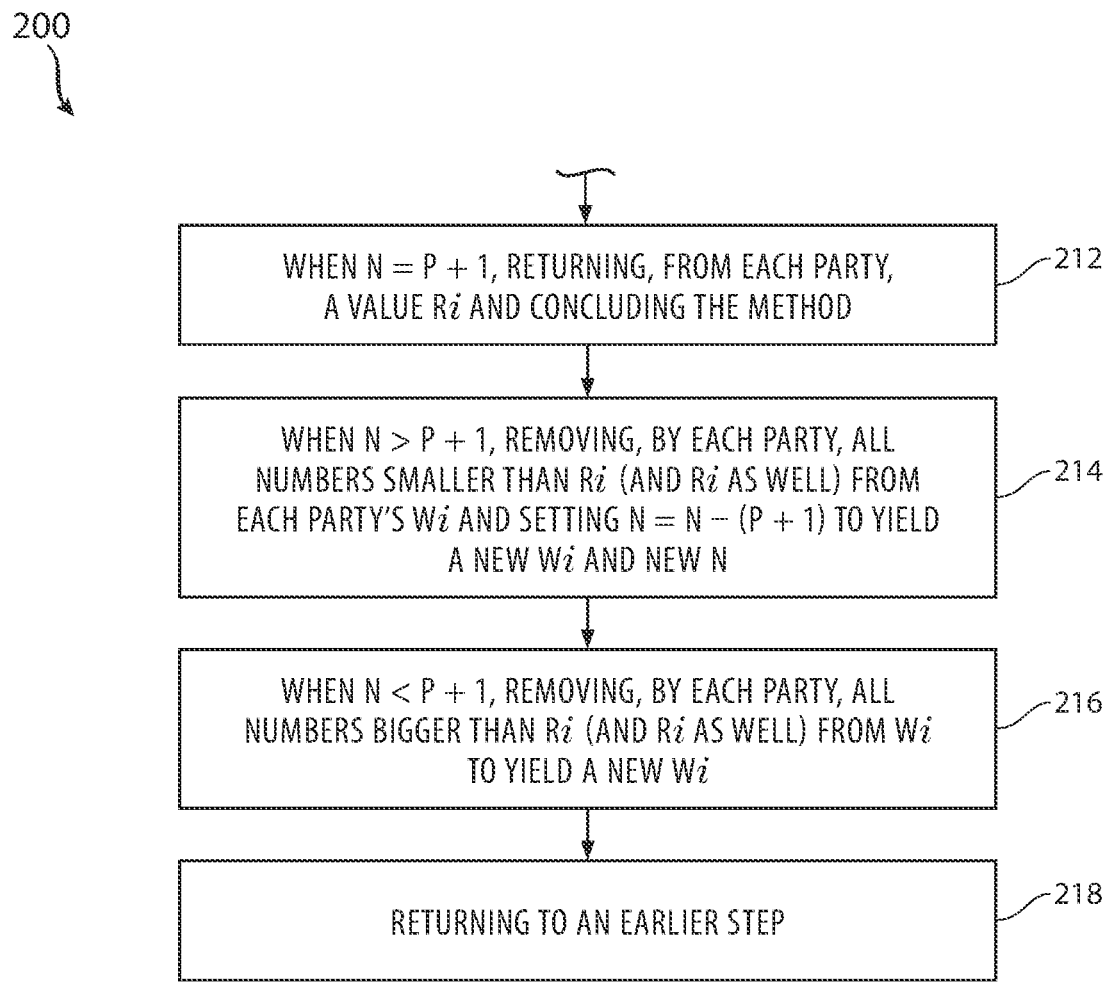
Figure 3:
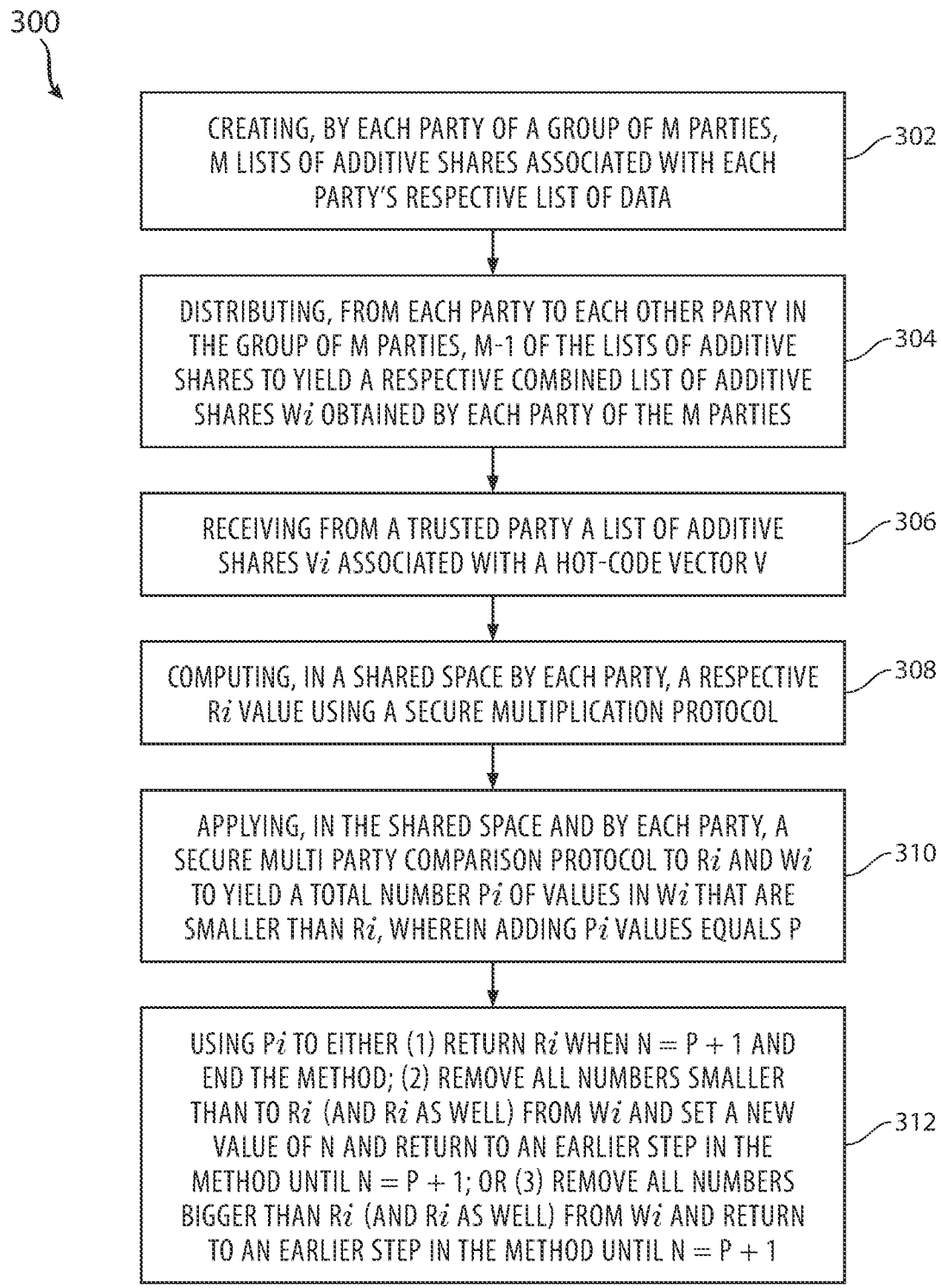
FIG. 3 illustrates another method embodiment.

A detailed example of how this process works shall be explained with respect to FIGS. 1-3. FIG. 1 illustrates a framework 100 in which a first party 102 has example data $L_1$=[1, 5, 6, 10], a second party 104 has a respective list of data $L_2$=[7, 0, 100] and a third party 106 has its private data $L_3$=[3, 4, 550]. In one example, the various respective lists of data are stored on computer-readable media on various computer systems. Each of the components 102, 104, 106 can represent the respective computer system of the respective party. The component 108 can represent the shared list which includes each combined list of data from the respective parties 102, 104, 106. Again, the respective lists can be shared over any type of network such as the Internet or a wireless network, cellular network and so forth.

Each party contributed their private lists of data to a combined list of data Si. Si=[0, 1, 3, 4, 5, 6, 7, 20, 100, 550]. Again, in one aspect, this is only in theory and the parties never actually share their data at a location that combined the various lists together. This figure therefore is used to show conceptually how the combined list might exist logically but not physically. The combined list in other words is the combination of the various lists that physically remain private on the computer systems of the various parties. The output of the solution disclosed herein is the Nth smallest value.

The number of participants can be termed "m" and 1<i<m. The total numbers in the combined list Si is S=s1+ . . . +sn. The algorithm disclosed herein enables the various parties to securely compute the Nth value of the combined list Si. Note that the approach could be used a number of different times to find various Nth values. Also note that in this example, the data is numerical although in other aspects the data might not be numerical or might be a combination of numerical data and non-numerical data.

Next, several examples shall be provided of the algorithm in practice. Assume in one example that there are the three parties shown in FIG. 1 with data: L1=[1, 5, 6, 10], L2=[7, 0, 100] and L3=[3, 4, 550]. The sorted combined list is $S_i$=[0, 1, 3, 4, 5, 6, 7, 20, 100, 550]. An unsorted list can be W=[1, 5, 6, 20, 7, 01, 100, 3, 4, 550]. The goal is to determine or compute the Nth value in the combined list. Note that the list, if it were sorted as in $S_i$ above, that the third position, for example, would have a value of 3. In the example, we'll assume that the goal is to find the value in the third position. The value of N can be set by the participants or in some other fashion.

The value of m is the number of participants which is 3 in this case. The value sj is the number of data in the list belonging to a user j. For example, user 1 has a sj value of 4 and the other two users have a sj value of 3. The value S is the total number of the data s1+s2+ . . . +2m, which in this case is 10.

The SMPC (secure multi-party computation) protocol disclosed herein is equipped with SecureMult and Secure-Compare on Ring R. An example of such protocols is found in U.S. patent application Ser. No. 16/828,216, filed on Mar. 24, 2020. The contents of this application are incorporated herein by reference. These are multi-party primitives enabling parties to perform multiplication and comparison securely as would be known by one of skill in the art. A ring is a set equipped with two binary operations and which prevents values from becoming too large. A ring is a set R equipped as noted above with two binary operations which can be + (addition) and * (multiplication) satisfying three sets of axioms called ring axioms. First, R is an abelian group under addition that has a number of requirements. Next, R is a monoid under multiplication with several requirements and third, the multiplication is distributive with respect to addition with several distributivity requirements. One of skill in the art will understand more of the ring structure in math.

In this example Ring R=[Z]264. This means that all the integers from 0 to 264 in the ring. The modulus of the ring is 264. In this example, the maximum value of the ring is 264 and if a number goes above 264, it gets wrapped around and starts over at 1. For example, if the modulus is 7, and a number being processed by the ring results in 11 (such as 5+6), the value would not be 11 because the maximum value of the ring is 7, but the number of would be 4. The reasons for the use of the Ring is to prevent the use of unlimited or infinite numbers when performing the operations disclosed herein.

The protocol or algorithm includes performing a loop of steps until the loop ends on step (5). The first (1) step involves one of the parties creating m additive shares (m−1 shares for other users and 1 for themselves) from their list and distributing them among the other users and themselves. The goal of step (1) is to generate three sets of shares W1, W2, W3 of the set W used for the rest of the process to enable the parties to compute the Nth smallest value of the combined list securely.

To do so, user number i, for each element A in their respective list, generates m−1 random numbers r1, . . . , ri−1, ri+1, . . . , rm−1 (from the Ring) and distributes them between the other parties and sets their own share: ri=A−r1−r2− . . . −ri−1−ri+1 . . . −rm−1.

Note that in step (1), each party computes their additive shares for each value A in their respective lists and shares the (m−1) additive shares (one share of the group of additive shares) to the other parties and computes their own additive share for their own value in the propose position.

This setup is needed to use the SMPC PROTOCOL which uses both the SecureMult and SecureCompare algorithms.

See the patent application incorporated above by reference for data on the SecureCompare algorithm and how it works in practice.

In the above example, party 2 has [7, 0, 100]. For each number in the list (say 7 for party 2), the respective party generates 2 random numbers (say 5, −2) and sends r1=5 to party 1 and sends r3=−2 to party 3 and sets his own share r2=7−5−(−2)=4. If the system adds 5, −2 and 4, the result is 7 and that's why this is called additive sharing. This process will be repeated for all numbers in the list. Each party gets only one share of the original value (7). The end of this process, for the one value 7 for the first party, each party's share will be as follows: Part 1 share: 5; Party 2 share: 4; Party 3 share: −2. For each number in each list, each party gets one number as a "share" of that number. If the system repeats the process for all numbers in all lists, each party will end up with S=s1+s2+. . . +sm shares. S=10 in this example.

In one example, here could be an example of the sets of shares each party would have. If these lists are added, the W=[1, 5, 6, 20, 7, 0, 100, 3, 4, 550] would be obtained:

$W_1$=[3, 0, 2, −3, 4, 5, 50, 12, 8, 214]
$W_2$=[−4, 7, 3, 14, 6, 4, 35, −9, 2, 150]
$W_3$=[2, −2, 1, 9, −10, −2, 15, 0, −6, 186]

Note how for each position, if all the numbers are added, the appropriate value of W is obtained. Such as position 3, in which 2+3+1=6. Each party only has access to the respective list of shares which hides the values of the data from the other parties.

Next in step (2), each party gets a share of a one-hot-code vector V of size S created by a trusted party. The goal of step (2) is to generate three sets of shares V1, V2, V3 associated with a hot-code vector V. Another goal is to select one of the numbers in the list randomly without letting the parties know which number that was selected. In other words, the goal is to select one number from the list of 10 numbers randomly but not tell the party which number they are evaluating. Each party has 10 numbers in their share of the combined list.

The trusted party can have a computer system that performs the operations disclosed herein with the proper security and structure and management to consider being a trusted party. A hot-code vector is a vector consisting of only 0's and a 1 in which there is only a single "1" in the vector with all the other values being zero. In one example, V=[0, 0, 0, 0, 0, 1, 0, 0, 0, 0]. In this example, it is the 6th position in the set of 10 values that is selected. However, how the system selects this number without telling the partis which value is being evaluated. Note that each of these 0's and the 1 is an additive share as defined above. For example, the system can generate randomly three sets of numbers:

$V_1$=[3, 4, 5, . . . ]
$V_2$=[−4, −4, 3, . . . ]
$V_3$=[1, 0, −8, . . . ].

The three parties will each get one of the randomly-generated set of numbers V1, V2, V3. The use of these three sets of numbers hides the selected number (the 6th position of V). Note that in the first position, the three shares (3, −4, 1) add up to zero. The second position of the various V1, V2, V3 sets of numbers includes (4, −4, 0) which adds up to zero, the third position adds up to zero as well (5+3−8) and so forth. The sixth position of V has the "1" and the three shares in that case would add up to 1. Each of these sets of numbers is a respective V set. In step (3), each party, with their respective Vi set of numbers computes Ri=Sum(SecureMult (Wi,Vi)). For example, if W1=[3, 0, 2, −3, 4, 5, 50, 12, 8, 214] and V1=[3, 4, 5, 3, −2, 9, 3, 8, 3, −4], then the sum of the secure multiplication of W1 and V1 (W1*V1) is 3*3+0 * 4+2 * 5+(−3) * 3+ . . . 214 * (−4)=R1. Assume in this example that R1=9, R2=17 and R3=−6. These represent a share of a randomly selected number from the sets. There may be more details about how this secure multi-party multiplication operates to obtain these values but at a high level this is how it works. If you add these three numbers (9, 17 and −6), the result is 20.

Note that from the original W=[1, 5, 6, 20, 7, 0, 100, 3, 4, 550], the value of 20 is the in the 8th position of this list or the 8th smallest value. Each party then has a "share" at the end of step (3) of the 8th smallest value in the list or the number 20. None of the parties knows the number 20 but have shares of the number 20.

Note as well that if V=[0, 0, 0, 1, 0, 0, 0, 0, 0, 0] then the actual sum of the secure multiplication of V with W would be [0, 0, 0, 20, 0, 0, 0, 0, 0, 0], or 0 +0 +0 +20 +0 +0 =20. Neither the system nor the parties do this computation as they only have shares of W and V.

Next, step (4) involves running the SecureCompare protocol on Ri and Wi to find the position of Ri in Wi. The parties get a set of V1, V2, V3 or shares of V as part of the SecureCompare protocol.

Each party runs the SecureCompare (Ri, Wi) protocol and gets one share of the final result.

The protocol returns the comparison result in "real space".

In step (5), if N=Pi+1 the protocol stops and returns Ri. In this case, N, the position the parties are trying to determine, is 3 and thus N does not equal 8 and the protocol is not ready to end but moves on to step (6).

Step (6) involves determining if N>Pi+1, which it is not. If it was, the system would remove all numbers smaller than Ri from their shares of W (or their Wi set) and set N=N−(Pi+1). The process would then loop back to step (2) with the smaller number of shares in the respective Wi list.

In step (7), if N<Pi+1, then the system removes all number bigger than or equal to Ri (8) from their shares of W and then returns to step (2). In this case, since 3 is less than 8, for party 1, the new W1 becomes [3, 0, 2, −3, 4, 5, 8] with 50, 12, 214 being removed.

Then, with the new W1, the system now has 7 values in this set and once the steps are performed by each of the three parties, the process starts returns to step (2) with a new set of W1, W2, W3.

FIG. 2 illustrates an example method 200 embodiment. The method 200 enables separate parties to compute securely an Nth smallest value in a combined list of values from m number of parties W. In one example, the method is performed across multiple computing devices (an example of which is in FIG. 4) in that each party has their own secure computing systems and share data with each other but then perform the computations and comparisons securely on their own systems with the data they receive.

The method 200 can include (1) creating, by each party of the m parties, m additive shares for each value in a respective list of values for each party of the m parties to yield m lists of additive shares for each party of the m parties (202), (2) distributing, from each party of the m parties, m−1 lists of additive shares from the m lists of additive shares for each party by distributing one of the m−1 lists of additive shares to each other party of the m parties to yield a respective combined list of shares Wi having S values for each of the m parties, wherein S equals the total number of values in the combined list of values from them parties (204), (3) receiving, from a trusted party and by each of the m parties, a respective list of additive shares Vi associated with a hot-code vector V comprising a value of 1 randomly assigned a position in V and the rest of the values being 0 (206), (4)

computing, by each party of the m parties and via a SecureMult protocol, Ri=Sum(SecureMult(Wi,Vi,) (208), (5) applying a comparison protocol to compare, by each party of the m parties, R against all elements in W, such that each party learns a total number of values in W that are smaller than R as a value Pi, where Pi is one share of the total number of values in W that are smaller than R and after combining all Pi values, all parties learn P, wherein a position or R in W is equal to P+1 (210), (6) when N=P+1, returning, from each party, a value Ri and concluding the method (212), (7) when N>P+1, removing, by each party, all numbers smaller than Ri (and Ri as well) from each party's Wi and setting N=N−(P+1) to yield a new Wi and new N (214), (8) when N<P+1, removing, by each party, all numbers bigger than Ri (and Ri as well) from Wi to yield a new Wi (216) and (9) returning to an earlier step such as step (3) (218). Other secure multiplication and comparison protocols can be used as well other than those listed above for the parties to be able to compute the data they need in a secure way.

The hot-code vector V has a number of values equal to S. This number of values S can change as the method iterates because the respective values of Wi are reduced in iterations which don't end in step (6). In step (7) the respective Wi is reduced where all numbers smaller or equal to Ri are removed and in step (8) it's all numbers bigger or equal to Ri are removed from Wi. As these operations are performed in the shared space, it is each party operating on their "additive shares" that they received from the other parties and not on the actual raw data. This can be in contrast to "real space" in which the parties are operating on the real data and not additional shares of the data.

The comparison protocol can be the SecureCompare protocol as discussed above. The method can loop or iterate from step (9) to step (3) until N=Pi+1. At that point, the method is done and the value of Ri is returned to the other parties or each respective party knows the value of Ri. Because each party operates in the "shared space" where they are operating on lists of numbers that are "shares" of the actual raw data, each party does not know what numbers are being compared. An owner of a value in the combined list only learns in the end that the value in the combined list W is smaller or bigger than a number the owner of the value does not know from the combined list W. The SecureMult protocol and the SecureCompare protocol operate on a Ring R set equipped with two binary operations. In one example, the Ring R=[Z]264 but other values of the modulus 264 can also be used as needed depending on the application of the method. The SecureMult protocol and the SecureCompare protocol include multi-party computation primitives enabling each party to perform multiplication and comparison securely.

In another example, each party will have a secure and separate computer server or system. The operations disclosed herein can also be considered from eth standpoint of each party's computer and what operations are just performed at that location. A system in this regard can be used for enabling separate parties to compute securely an Nth smallest value in a combined list of values from m number of parties W, the system being operated by one of the parties of the m parties. The system can include a processor and a computer-readable storage device storing instructions which, when executed by the processor, cause the processor to perform operations including (1) creating m additive shares for each value in a respective list of values for each party of the m parties to yield m lists of additive shares for each party of the m parties, (2) distributing m−1 lists of additive shares from the m lists of additive shares for each party by distributing one of the m−1 lists of additive shares to each other party of the m parties to yield a respective combined list of shares Wi having S values for each of the m parties, wherein S equals the total number of values in the combined list of values from the m parties, (3) receiving, from a trusted party, a respective list of additive shares Vi associated with a hot-code vector V comprising a value of 1 randomly assigned a position in V and the rest of the values being 0, (4) computing, via a SecureMult protocol, Ri=Sum(SecureMult(Wi,Vi,), (5) applying a comparison protocol to compare R against all elements in W, to learn a total number of values in Wi that are smaller than Ri as a value Pi, wherein Pi values add to equal P and wherein a position or Ri in Wi is equal to Pi+1, (6) when N=P+1, returning a value Ri and concluding the operations, (7) when N>P+1, removing all numbers smaller than Ri (and Ri as well) from each party's Wi and setting N=N−(P+1) to yield a new Wi and new N, (8) when N<P+1, removing all numbers bigger than or equal to Ri from Wi to yield a new Wi and (9) returning to an earlier step such as step (3).

Another method 300 embodiment is shown in FIG. 3. This is a broader version of the method of FIG. 2. In this aspect, a method 300 is used for determining an Nth smallest value in a list of combined values. The method 300 includes creating, by each party of a group of m parties, m lists of additive shares associated with each party's respective list of data (302), distributing, from each party to each other party in the group of m parties, m−1 of the lists of additive shares to yield a respective combined list of additive shares $W_i$, obtained by each party of the m parties (304), receiving from a trusted party a list of additive shares $V_i$ associated with a hot-code vector V (306), computing, in a shared space by each party, a respective $R_i$ value using a secure multiplication protocol (308), comparing, in the shared space, by each party and using secure multi-party comparison protocol, the respective $R_i$ to all elements in the respective combined list of additive shares $W_i$ to yield a total number $P_i$ of values in $W_i$ that are smaller than $R_i$ wherein adding $P_i$ values or shares equals P (310) and using P to either (1) return $R_i$ when N=P+1 and end the method; (2) remove all numbers smaller than $R_i$ (and $R_i$ as well) from $W_i$ and set a new value of N and return to an earlier step in the method until N=P+1; or (3) remove all numbers bigger than $R_i$ (and $R_i$ as well) from $W_i$ and return to an earlier step in the method until N=P+1 (312).

The method 300 can be performed be each party's computer system or as a group where various parties perform their portions of the operations of receiving data, distributing data (shares) and performing the multi-party operations to learn about the results of the comparison.

Figure 4:
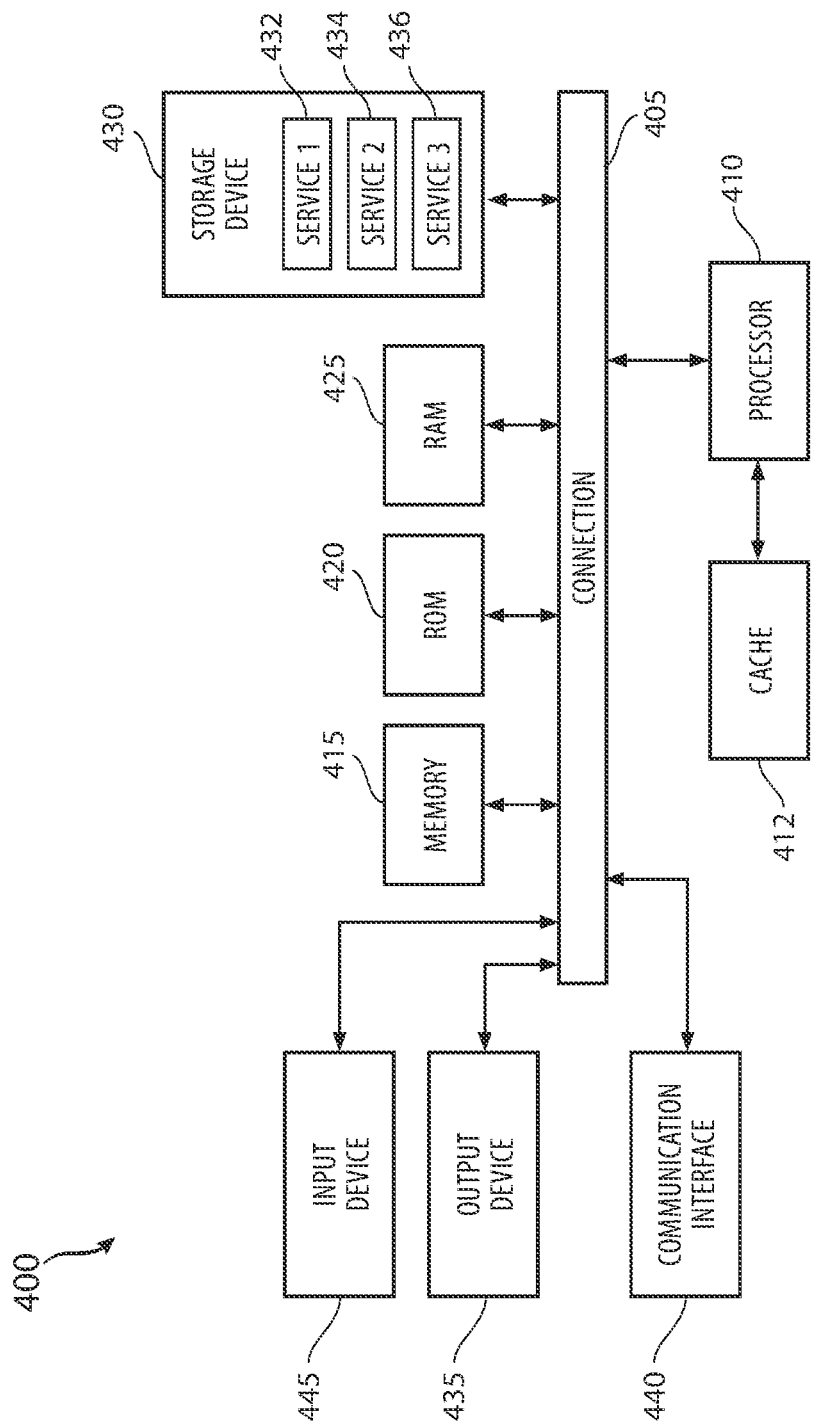
FIG. 4 illustrates an example system embodiment.

FIG. 4 illustrates example computer device that can be used in connection with any of the systems disclosed herein. In this example, FIG. 4 illustrates a computing system 400 including components in electrical communication with each other using a connection 405, such as a bus. System 400 includes a processing unit (CPU or processor) 410 and a system connection 405 that couples various system components including the system memory 415, such as read only memory (ROM) 420 and random-access memory (RAM) 425, to the processor 410. The system 400 can include a cache of high-speed memory connected directly with, in close proximity to, or integrated as part of the processor 410. The system 400 can copy data from the memory 415 and/or the storage device 430 to the cache 412 for quick access by the processor 410. In this way, the cache can provide a performance boost that avoids processor 410 delays while waiting for data. These and other modules can control or be configured to control the processor 410 to perform various actions. Other system memory 415 may be available for use as well. The memory 415 can include multiple different types of memory with different performance characteristics. The processor 410 can include any general-purpose processor and a hardware or software service or module, such as service (module) 1 432, service (module) 2 434, and service (module) 3 436 stored in storage device 430, configured to control the processor 410 as well as a special-purpose processor where software instructions are incorporated into the actual processor design. The processor 410 may be a completely self-contained computing system, containing multiple cores or processors, a bus, memory controller, cache, etc. A multi-core processor may be symmetric or asymmetric.

To enable user interaction with the device 400, an input device 445 can represent any number of input mechanisms, such as a microphone for speech, a touch-sensitive screen for gesture or graphical input, keyboard, mouse, motion input, speech and so forth. An output device 435 can also be one or more of a number of output mechanisms known to those of skill in the art. In some instances, multimodal systems can enable a user to provide multiple types of input to communicate with the device 400. The communications interface 440 can generally govern and manage the user input and system output. There is no restriction on operating on any particular hardware arrangement and therefore the basic features here may easily be substituted for improved hardware or firmware arrangements as they are developed.

Storage device 430 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 425, read only memory (ROM) 420, and hybrids thereof.

The storage device 430 can include services or modules 432, 434, 436 for controlling the processor 410. Other hardware or software modules are contemplated. The storage device 430 can be connected to the system connection 405. In one aspect, a hardware module that performs a particular function can include the software component stored in a computer-readable medium in connection with the necessary hardware components, such as the processor 410, connection 405, output device 435, and so forth, to carry out the function.

In some cases, such a computing device or apparatus may include a processor, microprocessor, microcomputer, or other component of a device that is configured to carry out the steps of the methods disclosed above. In some examples, such computing device or apparatus may include one or more antennas for sending and receiving RF signals. In some examples, such computing device or apparatus may include an antenna and a modem for sending, receiving, modulating, and demodulating RF signals, as previously described.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The methods discussed above are illustrated as a logical flow diagram, the operations of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the methods disclosed herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program including a plurality of instructions executable by one or more processors. The computer-readable or machine-readable storage medium may be non-transitory.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but can have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

We claim:

1. A method of enabling separate parties to compute securely an $N^{th}$ smallest value in a combined list of values from m number of parties W, the method comprising:
   (1) creating, by each party of the m parties, m additive shares for each value in a respective list of values for each party of the m parties to yield m lists of additive shares for each party of the m parties;
   (2) distributing, from each party of the m parties, m−1 lists of additive shares from the m lists of additive shares for each party by distributing one of the m−1 lists of additive shares to each other party of the m parties to yield a respective combined list of shares $W_i$ having S values for each of the m parties, wherein S equals the total number of values in the combined list of values from the m parties;
   (3) receiving, from a trusted party and by each of the m parties, a respective list of additive shares $V_i$ associated with a hot-code vector V comprising a value of 1 randomly assigned a position in V and the rest of the values being 0;
   (4) computing, by each party of the m parties and via a SecureMult protocol, $R_i$=Sum(SecureMult($W_i,V_i$,);
   (5) applying a comparison protocol to compare, by each party of the m parties, R against all elements in W, such that each party learns a total number of values in W that are smaller than R as a value in shared space $P_i$, wherein $P_i$ values add up to P and wherein a position or $R_i$ in $W_i$ is equal to $P_i$+1;
   (6) when N=P+1, returning, from each party, a value $R_i$ and concluding the method;
   (7) when N>P+1, removing, by each party, all numbers smaller than and $R_i$, and $R_i$ as well, from each party's $W_i$ and setting N=N−(P+1) to yield a new $W_i$ and new N;
   (8) when N<P+1, removing, by each party, all numbers bigger than $R_i$, and $R_i$ as well, from $W_i$ to yield a new $W_i$; and
   (9) returning to step (3).

2. The method of claim 1, wherein the hot-code vector V has a number of values equal to S.

3. The method of claim 1, wherein the comparison protocol comprises a SecureCompare protocol.

4. The method of claim 1, wherein the method loops from step (9) to step (3) until N=$P_i$+1.

5. The method of claim 1, wherein each party does not know what numbers are being compared.

6. The method of claim 1, wherein an owner of a value in the combined list only learns that the value in the combined list W is smaller or bigger than a number the owner of the value does not know from the combined list W.

7. The method of claim 3, wherein the SecureMult protocol and the SecureCompare protocol operate on a Ring R set equipped with two binary operations.

8. The method of claim 7, wherein the Ring R=$[Z]_2$64.

9. The method of claim 3, wherein the SecureMult protocol and the SecureCompare protocol comprise multi-party computation primitives enabling each party to perform multiplication and comparison securely.

10. A system for enabling separate parties to compute securely an $N^{th}$ smallest value in a combined list of values from m number of parties W, the system being operated by one of the parties of the m parties, the system comprising:
    a processor; and
    a computer-readable storage device storing instructions which, when executed by the processor, cause the processor to perform operations comprising:
    (1) creating m additive shares for each value in a respective list of values for each party of the m parties to yield m lists of additive shares for each party of the m parties;
    (2) distributing m−1 lists of additive shares from the m lists of additive shares for each party by distributing one of the m−1 lists of additive shares to each other party of the m parties to yield a respective combined list of shares $W_i$ having S values for each of the m parties, wherein S equals the total number of values in the combined list of values from the m parties;
    (3) receiving, from a trusted party, a respective list of additive shares $V_i$ associated with a hot-code vector V comprising a value of 1 randomly assigned a position in V and the rest of the values being 0;
    (4) computing, via a SecureMult protocol, $R_i$=Sum(SecureMult($W_i,V_i$,);
    (5) applying a comparison protocol to compare, by each party of the m parties, R against all elements in W, to learn a total number of values in W that are smaller than R as a value in shared space $P_i$, wherein a position of $R_i$ in $W_i$ is equal to $P_i$+1 and wherein values of $P_i$ add to a value P;
    (6) when N=P+1, returning a value $R_i$ and concluding the operations;
    (7) when N>P+1, removing all numbers smaller than $R_i$, and $R_i$ as well, from each party's $W_i$ and setting N=N−(P+1) to yield a new $W_i$ and new N;
    (8) when N<P+1, removing all numbers bigger than $R_i$, and $R_i$ as well, from $W_i$ to yield a new $W_i$; and
    (9) returning to step (3).

11. The system of claim 10, wherein the hot-code vector V has a number of values equal to S.

12. The system of claim 10, wherein the comparison protocol comprises a SecureCompare protocol.

13. The system of claim 10, wherein the method loops from step (9) to step (3) until N=$P_i$+1.

14. The system of claim 10, wherein each party does not know what numbers are being compared.

15. The system of claim 10, wherein an owner of a value in the combined list only learns that the value in the combined list W is smaller or bigger than a number the owner of the value does not know from the combined list W.

16. The system of claim 12, wherein the SecureMult protocol and the SecureCompare protocol operate on a Ring R set equipped with two binary operations.

17. The system of claim 16, wherein the Ring R=$[Z]_2$64.

18. The system of claim 12, wherein the SecureMult protocol and the SecureCompare protocol comprise multi-party computation primitives enabling each party to perform multiplication and comparison securely.

19. A method of determining an Nth smallest value in a list of combined values, the method comprising:
    creating, by each party of a group of m parties, m lists of additive shares associated with each party's respective list of data;
    distributing, from each party to each other party in the group of m parties, m−1 of the lists of additive shares to yield a respective combined list of additive shares $W_i$ obtained by each party of the m parties; receiving from a trusted party a list of additive shares $V_i$ associated with a hot-code vector V;

computing, in a shared space by each party, a respective $R_i$ value using a secure multiplication protocol;

applying, in the shared space, by each party a secure multi-party comparison protocol to $R_i$ and $W_i$, to yield a total number in shared space of $P_i$ of values in $W_i$ that are smaller than $R_i$, wherein adding $P_i$ values equals P; and using P to either (1) return $R_i$ when N=P+1 and end the method; (2) remove all numbers smaller and $R_i$, and $R_i$ as well, from Wi and set a new value of N and return to an earlier step in the method until N=P+1; or (3) remove all numbers bigger than $R_i$, and $R_i$ as well, from $W_i$ and return to an earlier step in the method until N=P+1.

* * * * *